J. N. GOODALL & F. S. HEAD.
COMBINED PIPE COUPLING AND VALVE.
APPLICATION FILED JUNE 18, 1909.
960,309.
Patented June 7, 1910.
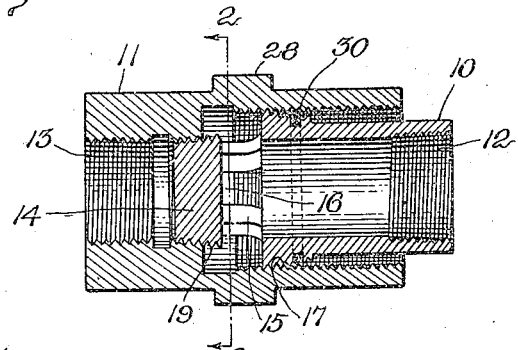
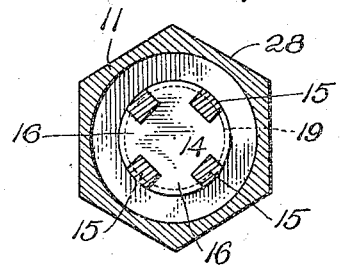
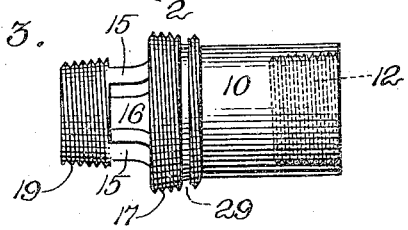
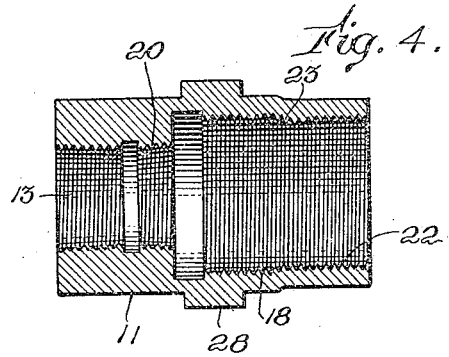
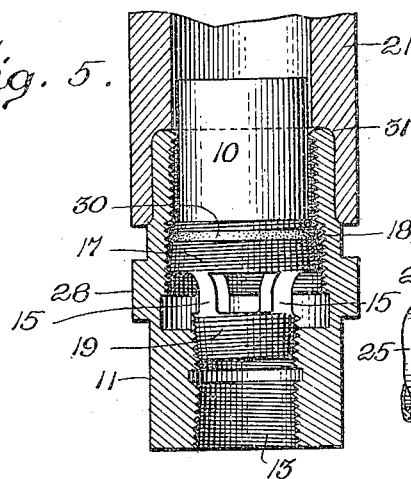
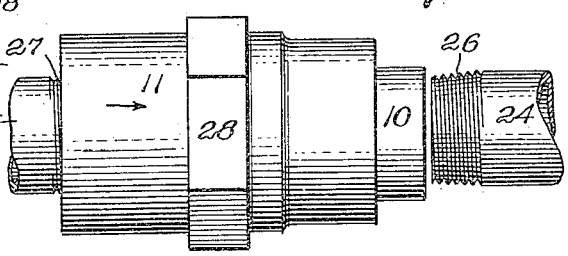
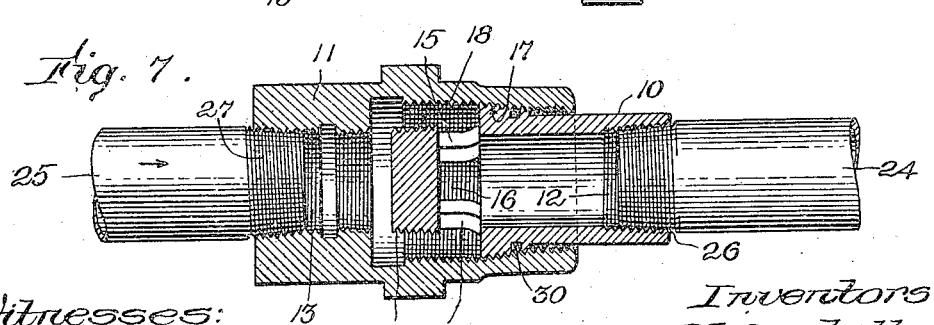
Witnesses:
W. P. Abell
P. W. Pezzetti
Inventors:
John N. Goodall
Frank S. Head
by their Attorneys

UNITED STATES PATENT OFFICE.

JOHN N. GOODALL, OF PORTSMOUTH, NEW HAMPSHIRE, AND FRANK S. HEAD, OF STONEHAM, MASSACHUSETTS.

COMBINED PIPE-COUPLING AND VALVE.

960,309.  Specification of Letters Patent.  Patented June 7, 1910.

Application filed June 18, 1909. Serial No. 502,870.

*To all whom it may concern:*

Be it known that we, JOHN N. GOODALL, of Portsmouth, in the county of Rockingham, State of New Hampshire, and FRANK S. HEAD, of Stoneham, in the county of Middlesex and State of Massachusetts, have invented certain new and useful Improvements in Combined Pipe-Couplings and Valves, of which the following is a specification.

This invention relates to coupling devices and is adapted for use in connection with pipes in which it is desired to couple two alined pipe sections to form a tight joint.

The invention is more especially adapted for use with pipes employed in conducting compressed air, liquids and other gases, without necessarily shutting off the supply in said pipes for the purpose of applying the coupling.

The invention is embodied in a pair of telescoping members connected by screw threads and formed with additional screw threads for engaging the pipes to be coupled.

One of the objects of the invention is to provide a structure whereby the two coupling members may be collapsed and extended with quite free movements except when they are being coupled to their respective pipe sections, their inter-engaging threads coöperating tightly and abruptly when they are being so coupled. It is well known that pipes, intended to be coupled by such devices, are formed with tapering threads by which a gradually increasing tightness of fit is effected when the members are applied.

According to the present invention, the coöperative coupling members are formed to engage pipe sections provided with tapering threads, whereby a gradually increasing tightness may be secured with respect to the pipe sections and whereby a relatively abrupt tightness between the two coupling members may be secured when they are moved with relation to each other for the purpose of connecting the pipe sections. In this way, the coöperative threads of the coupling members are at first loose fitting and are then caused to engage tightly and abruptly with each other before the connections with the pipe sections are advanced to their maximum tightness. The coupling members so formed, after moving into tightened relation to each other, may continue in such relation until the connection with the pipe sections has been tightened to the desired degree.

Another object of the invention is to provide means for entirely closing the flow passage when the members are collapsed and during a portion of the time when they are being extended.

The features of construction, by which these results are attained, are hereinafter described in detail and fully illustrated upon the accompanying drawings.

On the drawings, which illustrate one embodiment of the invention,—Figure 1 represents a longitudinal section of a pair of coöperative coupling members in their initial position. Fig. 2 is a cross section on the line 2—2 of Fig. 1. Fig. 3 is a longitudinal elevation of the inner coupling member. Fig. 4 is a longitudinal section of the outer coupling member. Fig. 5 is a longitudinal section of the two members assembled in their initial position together with a forming die adapted to compress the outer member, whereby it may coöperate with the inner member as hereinafter explained. Fig. 6 is an elevation of the assembled coupling members in their initial position as applied to one of two pipe sections. Fig. 7 is a longitudinal section of the coupling members as applied to the two pipe sections to be coupled, the members and pipe sections being in their coupled positions.

The same reference characters indicate the same parts wherever they occur.

In carrying out the invention, the two coupling members 10 and 11 are assembled prior to giving the outer member 11 its ultimate form. Before describing the final forming of said member the other details of construction will be explained. The outer end of the member 10 is formed with a tapering thread 12 adapted to engage one pipe section, and the member 11 is formed with a similar tapering thread 13 adapted to likewise engage another pipe section. Both of the coupling members are of tubular formation, thereby providing a flow passage through which the fluid may pass from one pipe section to the other. The inner end of the member 10 is formed with a plug shaped head 14 to which it is joined by a plurality of bridge portions 15 which are sufficiently separated, as shown by Fig. 2, to provide passages 16 through which the fluid may pass to the interior member. The members 10 and 11 have telescoping relation with each other whereby they may be collapsed and extended and to this end are formed respectively with an external thread 17 and an internal thread 18. In the form illustrated head 14 is formed with an external thread 19 which is adapted to coöperate with an internal thread 20 formed in the member 11. One or both of the members 19 20 may be tapered, so as to secure a tight joint when the two coupling members occupy their initial relation, as shown by Figs. 1 and 5, and therefore constitute a valve and valve seat respectively. But this taper, if employed, is very slight; for to attain the functions of these valve and seat members, the external form of the plug-shaped head and the internal form of the flow passage of the member 11 must correspond and be so nearly cylindrical that the head-carrying member 10 can be manipulated to a considerable extent without affecting the control of the flow by means of said head.

The internal thread 18 of the outer member is formed initially of uniform diameter throughout its length, and the external thread 17 of the inner member is preferably tapered and of such maximum diameter as to be adapted to turn freely in the thread 18. After assembling the members 10 and 11, as shown by Fig. 1, the member 11 is given its ultimate form by a die 21, as shown by Fig. 5. The interior of the die is of uniform diameter and slightly less than the initial exterior diameter of the member 11, and is forced upon that end of the member in which the member 10 is inserted so far as to reduce the diameter of a portion thereof so that while one portion remains its original diameter, another portion is of slightly less diameter, there being then a contracted portion 22 of uniform diameter forming a continuation of the threaded portion 18 but of slightly less diameter, and connected therewith by a relatively abrupt threaded shoulder 23.

When the combined members 10 and 11 are collapsed or shortened as shown by Fig. 1, the threaded valve member 14 is so tightly engaged with the threaded valve seat 20 as to completely close the flow passage through said members. In applying the coupling, the two pipe sections 24 and 25, which are to be joined, are preferably provided with tapering threads 26 and 27 at their adjacent ends, adapted to receive the threaded portions 12 and 13. The space between the ends of the pipes is first determined with relation to the combined length of the coupling members when shortened or collapsed, and is such as to slightly clear one of the coupling members when the other is screwed upon its respective pipe section. For the sake of convenience, it may be desirable to first apply the member 11, and for this purpose, it is necessary to displace one of the pipe sections out of alinement until the device is coupled to the other pipe section, as shown by Fig. 6, whereupon the displaced pipe section may resume its normal alined position. Assuming that the pipe, indicated at 25, is the supply section and that the pressure is in the direction indicated by arrows, the supply is closed by the valve or head 14 immediately upon screwing the member 11 tightly upon said section, while the members are collapsed and the pipe section 24 is still uncoupled. For the purpose of turning the member 11, its exterior may be provided with a wrench fitting 28. Having completed the connection between the member 11 and the section 25, the protruding end of the member 10 may then be turned by any appropriate tool such as a Stillson wrench by which it may be screwed in the direction of the pipe section 24. The proportions are preferably such that about two turns can be given to the member 10 before the threaded portion 17 comes into a close and tight engagement with the abrupt threaded shoulder 23. The threaded head 14 will still be partly within the flow passage of the member 11, and the end of thread 12 will be just engaged with the end of pipe 24, or so nearly so that the final screwing home proceeds with certainty, there being no opportunity for any material escape of fluid after the head 14 completely opens, because the other two threaded joints are quickly made tight. During this operation, there is a preliminary or initial loose fit of the two coupling members which is then supplemented by a relatively tight fit whose tightness increases abruptly to a maximum degree. Continued advancement of the member 10 results in coöperation of the threaded portion 12 with the pipe section 24, and a gradually increasing fit between said parts. The member 10, after having moved into tight relation with the member 11, is adapted to be advanced until the connection between it and the pipe section 24 is completed with the desired degree of tightness. During the first part of these movements, however, the head 14 is still so well within the flow passage of the member 11 that there is little or no leakage of fluid. The tip end of the head 14 does not leave said flow passage until the first portion of the act of coupling to the pipe 24 has commenced. During the completion of the coupling the screw-threaded valve 14 recedes from its threaded valve seat to the position shown by Fig. 7, thereby opening the flow passage so that the supply of fluid may pass around the bridges 15 and through the spaces 16 into the interior of the member 10 and thence to the pipe section 24.

The member 10 is here shown as formed with a peripheral groove 29 formed in the threaded portion 17. This groove may, if desired, be filled with graphite or any other appropriate lubricating substance indicated at 30 which is adapted to adhere to the screw-threaded shoulder 23 and thus facilitate the advancement of the portion 17.

The inner end of the die 21 may be curved as indicated at 31 for the purpose of compressing the open end of the member 11 to a greater degree than the portion previously compressed. By so compressing the end of this member, it is adapted to prevent entire removal of the member 10. The coupling members so formed and related are adapted to be coupled and uncoupled as often as required and to preserve the same relation without appreciable loss of effectiveness due to a repetition of operations.

Although the threaded portion 17 here shown is of tapered formation, it is not absolutely necessary to form it in this way, inasmuch as the shoulder 23 is not so abrupt as to prevent the use of a screw-thread of uniform diameter instead of the tapered thread shown. The operation would be the same if a uniform thread were formed instead of the tapered thread 17, and, in either event, similar conditions would prevail in applying the coupling member. To repeat, the successive conditions which prevail in applying the coupling to the second pipe section are such that the act of making the connection between the two coupling members is at first quite free and changes abruptly to a fit of maximum tightness and continues so during the time that the connection between the inner member and the second pipe section is increasing gradually to maximum tightness.

Having thus explained the nature of our said invention and described a way of constructing and using the same, although without attempting to set forth all of the forms in which it may be made or all of the modes of its use, what we claim is:

1. A pipe coupling comprising an outer member formed with an internal screw thread in two sections of different diameters, each section being of uniform diameter, and an inner member formed with an external screw thread adapted to coöperate with both of said sections.

2. A pipe coupling comprising inner and outer members, an external thread on the inner member, and an internal thread in the outer member comprising a section of relatively large uniform diameter adapted to coöperate freely with said external thread, and a section of relatively small uniform diameter adapted to coöperate tightly with said external thread, said sections being arranged to be engaged at the same time.

3. A device of the character described, comprising two tubular members having connections to permit collapsing and extending the device, one of said members having a plug-shaped head having an external form corresponding with the internal form of the flow passage of the other member, passages being formed behind said head for the flow of fluid, said head being adapted to have considerable movement within said passage without opening it to permit escape of fluid, whereby the head-carrying member may be manipulated to a material extent without affecting the control of the flow by said head.

4. A device of the character described, comprising two tubular members having screw-thread connections to permit collapsing and extending the device, one of said members having an externally-threaded plug-shaped head, the other member having an internally-threaded flow passage into and from which said threaded head may be screwed, passages being formed behind said head for the flow of fluid, the coöperative threads of said head and flow passage being of a length to permit the head to be given a considerable movement within said passage without opening it to permit escape of fluid.

5. A pipe coupling comprising inner and outer members, the outer member having different portions of its length provided with internal threads of slightly differing diameters, an abrupt threaded shoulder being formed at the junction of said portions of different diameters, the inner member having an external thread to loosely fit said internal thread having the larger diameter, but of a size to permit it to completely pass by the said abrupt threaded shoulder.

6. A pipe coupling comprising inner and outer members, the outer member having different portions of its length provided with internal threads of slightly differing diameters, an abrupt threaded shoulder being formed at the junction of said portions of different diameters, the inner member having an external thread to loosely fit said internal thread having the larger diameter, but of a size to permit it to completely pass by the said abrupt threaded shoulder, said inner member having an externally-threaded head and formed with flow passages behind said head, the outer member having an internally-threaded flow port into and from which the threaded head can be screwed.

In testimony whereof we have affixed our signatures, in presenec of two witnesses.

JOHN N. GOODALL.
FRANK S. HEAD.

Witnesses:
W. P. ABELL,
P. W. PEZZETTI